United States Patent
Bae et al.

(10) Patent No.: US 10,706,548 B2
(45) Date of Patent: Jul. 7, 2020

(54) AUTOMATED SEGMENTATION OF ORGANS, SUCH AS KIDNEYS, FROM MAGNETIC RESONANCE IMAGES

(71) Applicant: UNIVERSITY OF PITTSBURGH-OF THE COMMONWEALTH SYSTEM OF HIGHER EDUCATION, Pittsburgh, PA (US)

(72) Inventors: Kyong Tae Bae, Pittsburgh, PA (US); Youngwoo Kim, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 223 days.

(21) Appl. No.: 15/758,358

(22) PCT Filed: Sep. 14, 2016

(86) PCT No.: PCT/US2016/051575
§ 371 (c)(1),
(2) Date: Mar. 8, 2018

(87) PCT Pub. No.: WO2017/048744
PCT Pub. Date: Mar. 23, 2017

(65) Prior Publication Data
US 2018/0253849 A1 Sep. 6, 2018

Related U.S. Application Data

(60) Provisional application No. 62/220,296, filed on Sep. 18, 2015.

(51) Int. Cl.
*G06K 9/00* (2006.01)
*G06T 7/11* (2017.01)
(Continued)

(52) U.S. Cl.
CPC .............. *G06T 7/11* (2017.01); *G06K 9/6207* (2013.01); *G06T 7/12* (2017.01); *G06T 7/143* (2017.01);
(Continued)

(58) Field of Classification Search
None
See application file for complete search history.

(56) References Cited

U.S. PATENT DOCUMENTS 7,809,190 B2   10/2010   Rousson et al.
8,682,074 B2   3/2014    Boettger
(Continued)

OTHER PUBLICATIONS

Gloger, O. et al., 'Prior Shape Level Set Segmentation on Multistep Generated Probability Maps of MR Datasets for Fully Automatic Kidney Parenchyma Volumetry', IEEE Transactions on Medical Imaging ( vol. 31, Issue: 2, Feb. 2012 ), pp. 312-325.
(Continued)

*Primary Examiner* — Atiba O Fitzpatrick
(74) *Attorney, Agent, or Firm* — Eckert Seamans Cherin & Mellott, LLC; Philip E. Levy

(57) ABSTRACT

A method of segmenting an MR organ volume includes performing regional mapping on the MR organ volume using a spatial prior probability map of a location of the organ to create a regionally mapped MR organ volume, and performing boundary refinement on the regionally mapped MR organ volume using a level set framework that employs the spatial prior probability map and a propagated shape constraint to generate a segmented MR organ volume.

15 Claims, 13 Drawing Sheets

(51) Int. Cl.
*G06T 7/12* (2017.01)
*G06K 9/62* (2006.01)
*G06T 7/143* (2017.01)
*G06T 7/73* (2017.01)

(52) U.S. Cl.
CPC .......... *G06T 7/73* (2017.01); *G06K 2209/051* (2013.01); *G06T 2207/10088* (2013.01); *G06T 2207/20076* (2013.01); *G06T 2207/20081* (2013.01); *G06T 2207/20116* (2013.01); *G06T 2207/20128* (2013.01); *G06T 2207/20161* (2013.01); *G06T 2207/30064* (2013.01); *G06T 2207/30084* (2013.01)

(56) References Cited

U.S. PATENT DOCUMENTS

| | | | |
|---|---|---|---|
| 2008/0118136 A1 | 5/2008 | Cai et al. | |
| 2015/0030219 A1 | 1/2015 | Madabhushi et al. | |
| 2015/0286786 A1* | 10/2015 | El-Baz | G06T 7/33 382/131 |
| 2019/0237186 A1* | 8/2019 | El-Baz | A61B 5/201 |

OTHER PUBLICATIONS

Kim Y. et al., 'Automated Segmentation of Kidneys from MR Images in Patients with Autosomal Dominant Polycystic Kidney Disease.', Clinical Journal of the American Society of Nephrology. vol. 11, Apr. 2016. pp. 1-9. Published on Jan. 21, 2016 as DOI: 10.2215/CJN.0830081 5.

Chen Y. et al., 'Using Prior Shapes in Geometric Active Contours in a Variational Framework', International Journal of Computer Vision 50(3), pp. 315-328, 2002.

Bae K. et al., 'Segmentation of Individual Renal Cysts from MR Images in Patients with Autosomal Dominant Polycystic Kidney Disease', Clinical Journal of the American Society of Nephrology. vol. 8, Jul. 2013. pp. 1089-1097.

Ho S. et al., 'Level-Set Evolution with Region Competition: Automatic 3-D Segmentation of Brain Tumors', 16th International Conference on Pattern Recognition, 2002. pp. 1-4. DOI: JO.I J09/1CPR.2002.1 044788.

Racimora D. et al., 'Segmentation of Polycystic Kidneys from MR images', Proc. SPIE 7624, Medical Imaging 2010: Computer-Aided Diagnosis, 76241W (Mar. 9, 2010); pp. 540-550. DOI: 10.1117/12. 844361.

\* cited by examiner

INTERATIVELY DETERMINE ROUGH KIDNEY BOUNDARIES FOR EACH OF THE LEFT AND RIGHT KIDNEY REGIONS USING THE MAP OF CANDIDATE KIDNEY REGIONS AND A LEVEL SET FRAMEWORK THAT USES THE SPPM AND A PROPAGATED SHAPE CONSTRAINT TO CREATE AN EVOLVED CONTOUR FOR EACH OF THE LEFT AND RIGHT KIDNEY REGIONS — 65

PERFORM MORPHOLOGICAL CLOSING ON THE EVOLVED CONTOUR FOR EACH OF THE LEFT AND RIGHT KIDNEY REGIONS TO GENERATE THE AUTOMATICALLY SEGMENTED SUBJECT MR KIDNEY VOLUME — 70

*FIG.6*

AUTOMATED SEGMENTATION OF ORGANS, SUCH AS KIDNEYS, FROM MAGNETIC RESONANCE IMAGES

CROSS-REFERENCE TO RELATED APPLICATION

This application is a U.S. National Phase Application under 35 U.S.C. § 371 of International Application No. PCT/2016/051575, filed on Sep. 14, 2016, entitled "AUTOMATED SEGMENTATION OF ORGANS, SUCH AS KIDNEYS, FROM MAGNETIC RESONANCE IMAGES," which claims the priority benefit under 35 U.S.C. § 119(e) of U.S. Provisional Application No. 62/220,296, filed on Sep. 18, 2015, the contents of which are herein incorporated by reference.

GOVERNMENT CONTRACT

This invention was made with government support under grants # s DK056943, DK056956, DK056957, DK056961 awarded by the National Institutes of Health (NIH). The government has certain rights in the invention.

BACKGROUND OF THE INVENTION

1. Field of the Invention

The disclosed concept pertains to the segmentation of magnetic resonance (MR) images, and, in particular, to a fully automated system and method for segmentation of MR images of organs such as kidneys. In one particular implementation, the disclosed concept pertains to a fully automated system and method for segmentation and volumetric measurement of kidneys from MR images in subjects, such as subjects with ADPKD.

2. Description of the Related Art

Autosomal dominant polycystic kidney disease (ADPKD) is the most common hereditary renal disorder and the third most common cause of end-stage renal disease (ESRD). ADPKD is characterized by bilateral enlarged kidneys containing numerous cysts that expand and compress surrounding renal parenchyma. For the assessment of the severity and the progression of ADPKD, total kidney volume (TKV), also known as total renal volume (TRV), is an important biomarker and is also known to be associated with declining glomerular filtration rate (GFR). Nevertheless, the relationship between the TKV and renal function in patients with ADPKD remains complicated and controversial because there are a number of confounding factors affecting the mechanism of the ADPKD progression.

The Consortium for Radiologic Imaging Studies of Polycystic Kidney Disease (CRISP) was established to explore the associations among the renal or cyst volume, renal function and clinical variables, and to evaluate their changes during the course of the disease. CRISP performed studies wherein kidneys were segmented manually from MR images to compute TKV, which was subsequently analyzed in association with other clinical, functional and genetic biomarkers.

Various methods for manually segmenting kidneys and thereafter quantifying kidney volumes from CT or MR images in subjects with ADPKD are known. One such method utilizes manual delineation and adaptive thresholding to segment ADPKD kidneys and cysts, respectively. Stereology is another commonly used manual approach to segment and quantify the volumes of kidneys and cysts. These manual segmentation methods rely heavily on the observer's perception and manual input to complete the segmentation process. Although the manual segmentation methods are straightforward, they are resource intensive, time consuming, and subject to analyst bias and error.

A number of semi-automated methods for the segmentation of ADPKD kidneys that still require the observer's perceptual guidance and input are also known. To date, however, a fully-automated system and method of segmentation of kidneys in ADPKD has not been developed.

SUMMARY OF THE INVENTION

In one embodiment, a method of segmenting an MR organ volume is provided. The method includes performing regional mapping on the MR organ volume using a spatial prior probability map of a location of the organ to create a regionally mapped MR organ volume, and performing boundary refinement on the regionally mapped MR organ volume using a level set framework that employs the spatial prior probability map and a propagated shape constraint to generate a segmented MR organ volume.

In another embodiment, a computerized system for segmenting an MR organ volume is provided. The system includes a processing apparatus, wherein the processing apparatus includes: a spatial prior probability map component that includes a spatial prior probability map of a location of the organ; a regional mapping component configured for creating a regionally mapped MR organ volume by performing regional mapping on the MR organ volume using the spatial prior probability map; and a boundary refinement component configured for generating a segmented MR organ volume by performing boundary refinement on the regionally mapped MR organ volume using a level set framework that employs the spatial prior probability map and a propagated shape constraint.

BRIEF DESCRIPTION OF THE DRAWINGS

FIG. 6 is a flowchart showing a method of performing boundary refinement of according to one exemplary embodiment of the disclosed concept;

DETAILED DESCRIPTION OF EXEMPLARY EMBODIMENTS

Figure 1:
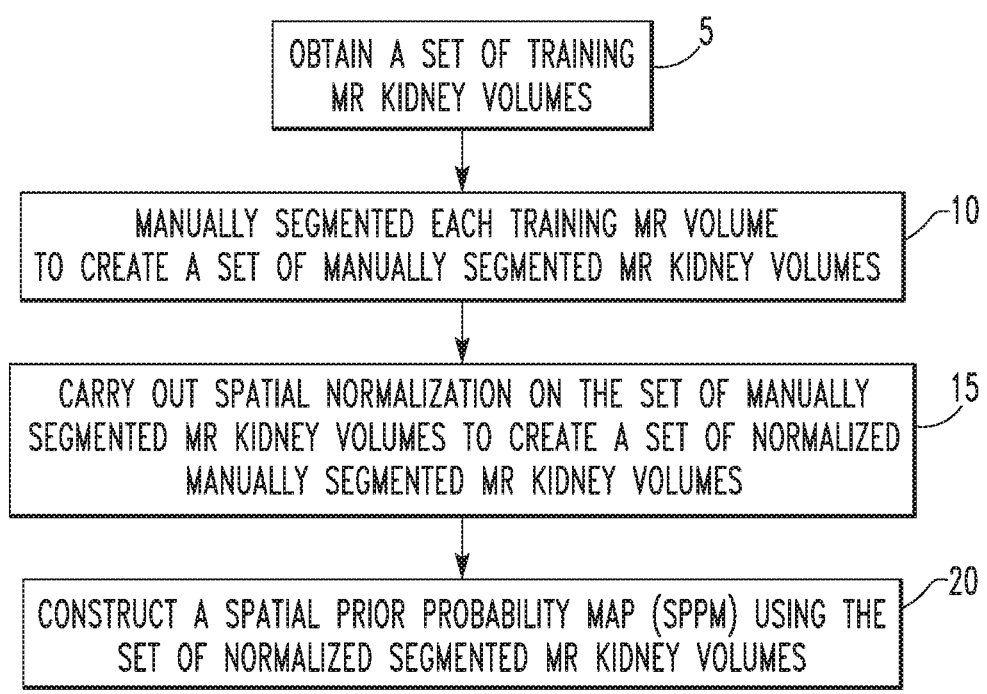
FIG. 1 is a flowchart showing a method for constructing an SPPM used in the automated segmentation methodology of the disclosed concept according to an exemplary embodiment.

As used herein, the singular form of "a", "an", and "the" include plural references unless the context clearly dictates otherwise.

As used herein, the statement that two or more parts or elements are "coupled" shall mean that the parts are joined or operate together either directly or indirectly, i.e., through one or more intermediate parts or elements, so long as a link occurs.

As used herein, "directly coupled" means that two elements are directly in contact with each other.

As used herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term "MR kidney volume" shall mean a set of MR kidney images (e.g., in digital form) representing the entirety (i.e. the entire volume) of a patient's kidneys, with each MR kidney image being an MR slice at a particular depth. Each MR kidney image in the MR kidney volume is represented by a number of pixels.

As used herein, the term "kidney segmentation" shall mean identifying in each MR kidney image of an MR kidney volume which pixels represent the kidney and which pixels do not represent the kidney. Kidney segmentation thus enables the outer boundary of the kidney in each MR kidney image of an MR kidney volume to be delineated.

As used herein, the term "segmented MR kidney volume" shall mean an MR kidney volume wherein each pixel is identified as either representing the kidney (e.g., 1) or not representing the kidney (e.g., 0).

As used herein, the term "manually segmented MR kidney volume" shall mean an MR kidney volume that has been segmented manually by a clinician such as a radiologist by assigning each pixel a value of 1 or 0.

As used herein, the term "spatial prior probability map (SPPM)" shall mean a set of pixels having probability values that range from 0 to 1, which probability values refer to the locational probability of whether the pixel represents a certain item (e.g. kidney) within a certain space or location (e.g., the abdomen).

As used herein, the term "regional mapping" shall mean a process that divides a certain space or location (e.g., the abdomen) into two separate areas, in which items to be segmented (e.g., kidney) are contained, by using magnitudes of gradients and an SPPM.

As used herein, the term "boundary refinement" shall mean a process of fine segmentation which determines whether a certain pixel belongs to an object (e.g., a kidney) formulated as a level set framework with constraints of an SPPM and propagated shape constraints (PSCs)).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

In the exemplary embodiment, the disclosed concept provides a fully automated method (in the form of a computer program in the exemplary embodiment) that allows for segmentation and/or volumetric measurement of kidneys from MR images in subjects, such as subjects with ADPKD. In particular, as described in further detail herein, the disclosed concept provides a fully automated system and method for segmentation and/or volumetric measurement of kidneys from MR images that employs (i) a spatial prior probability map (SPPM) of the location of kidneys in abdominal MR images, (ii) regional mapping with total variation regularization, and (iii) boundary refinement using propagated shape constraints (PSCs) formulated into a level set framework for enforcing kidney contours in neighboring MR images. An aspect of the disclosed concept described herein also involves the methodology for construction of the SPPM used in the automated segmentation.

Figure 2A:
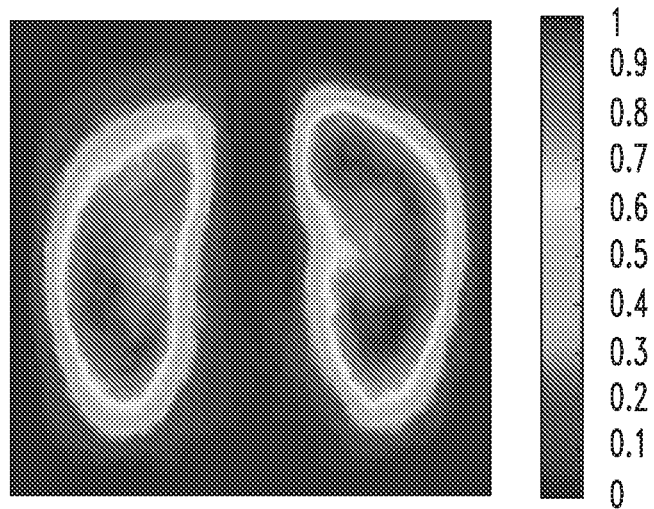
FIGS. 2a and 2b show an example of a constructed SPPM.
Figure 2B:
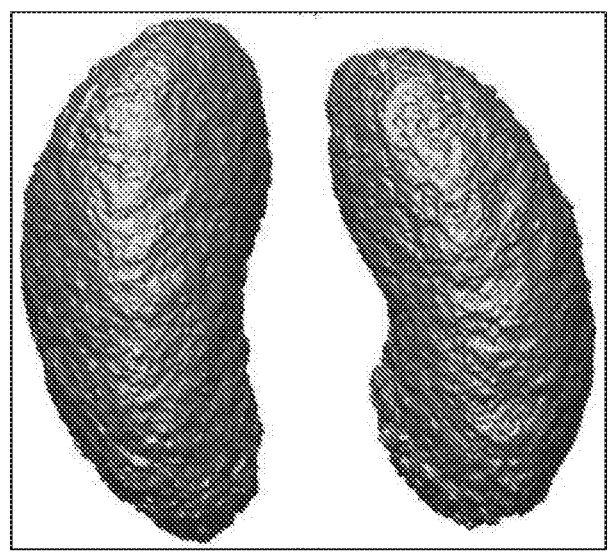

FIG. 1 is a flowchart showing a method for constructing the SPPM used in the automated segmentation methodology of the disclosed concept according to an exemplary embodiment. The method begins at step 20, wherein a set of training MR kidney volumes is obtained. Next, at step 10, each training MR kidney volume in the set is manually segmented by a radiologist to create a set of manually segmented MR kidney volumes. Then, at step 15, spatial normalization on the set of manually segmented MR kidney volumes is carried out to create a set of normalized manually segmented MR kidney volumes. In the exemplary embodiment, step 15 employs volume-based spatial normalization using Lanczos interpolation to normalize the variation in the fields of view among the training MR kidney volumes. Finally, at step 20, the SPPM is constructed using the set of normalized manually segmented MR kidney volumes. An example of a constructed SPPM is shown in FIGS. 2a and 2b, wherein FIG. 2a shows the median slice with a probability color scale and FIG. 2b shows a surface rendering representation at probability 0.5.

In one non-limiting exemplary embodiment, the equation for the SPPM generation is as follows:

$$P_{SPPM}(x) = \frac{1}{N}\int_{i=1}^{N} M_i(x)di$$

Figure 3:
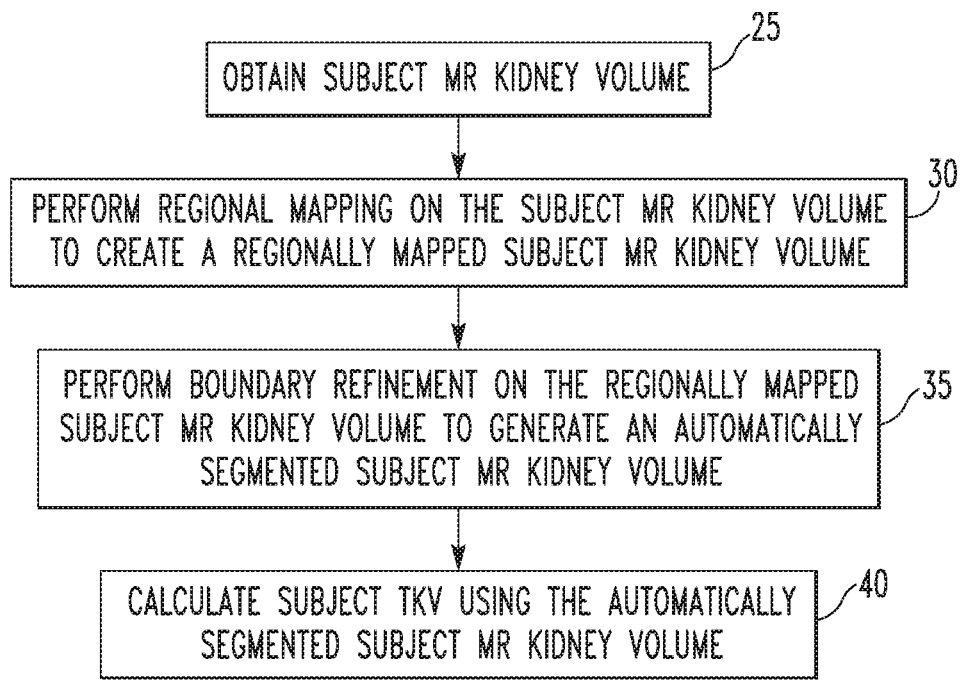
FIG. 3 is a flowchart showing a fully automated kidney segmentation and volumetric measurement method according to an exemplary embodiment of the disclosed concept.

FIG. 3 is a flowchart showing a fully automated kidney segmentation and volumetric measurement method according to an exemplary embodiment of the disclosed concept. In the exemplary embodiment, the method of FIG. 3 uses the SPPM generated according to the method of FIG. 2. The method begins at step 25, wherein the subject MR kidney volume (i.e., the MR kidney volume that is to be segmented and measured) is obtained. Next, at step 30, regional mapping is performed on the subject MR kidney volume to create a regionally mapped subject MR kidney volume. Then, at step 35, boundary refinement is performed on the regionally mapped subject MR kidney volume to generate an automatically segmented subject MR kidney volume. Finally, at step 40, the subject total kidney volume (TKV) is calculated using the automatically segmented subject MR kidney volume.

Figure 4:
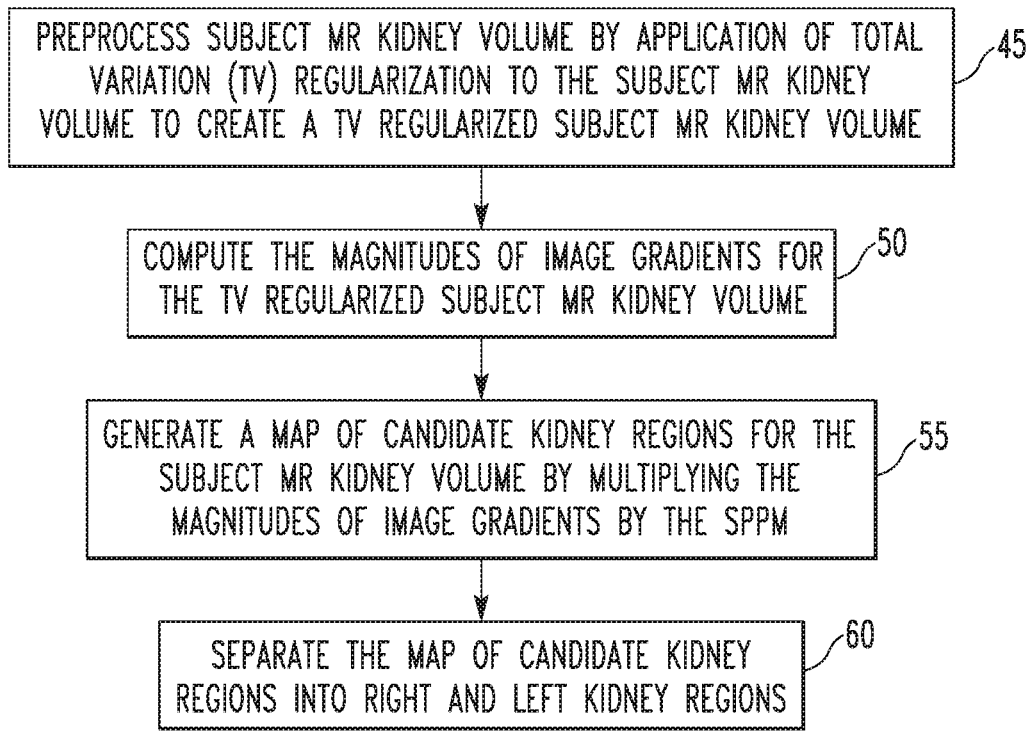
FIG. 4 is a flowchart showing a method of performing regional mapping according to one exemplary embodiment of the disclosed concept.
Figure 5A:
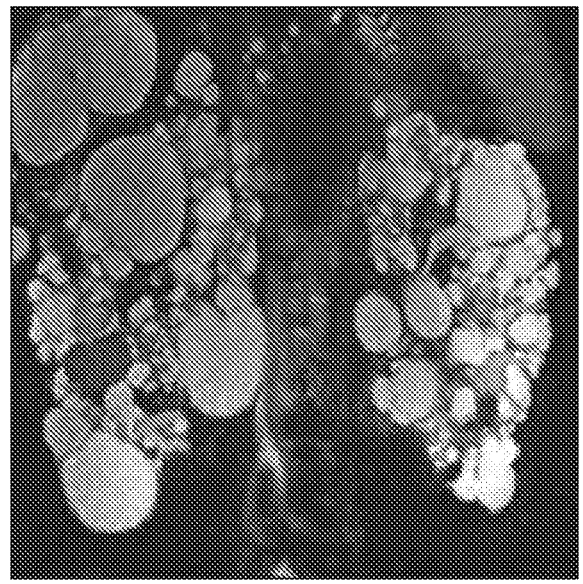
FIGS. 5a-5d show sample images according to an exemplary embodiment of the disclosed concept
Figure 5B:
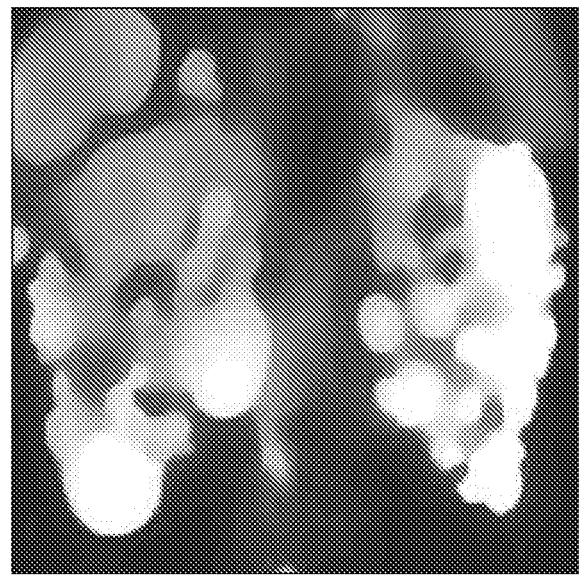
Figure 5C:
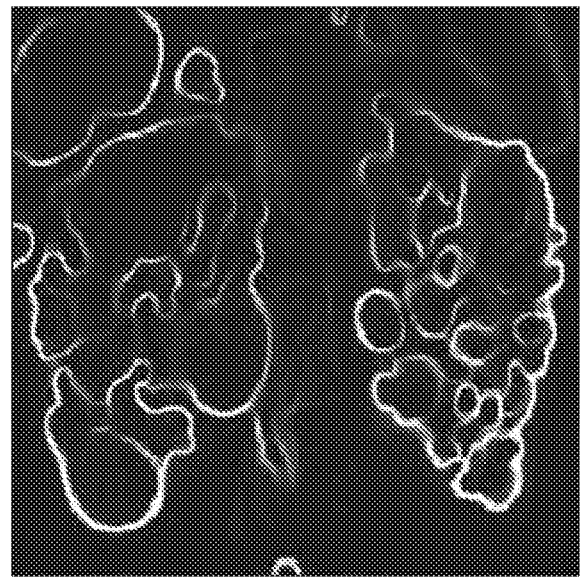

FIG. 4 is a flowchart showing a method of performing the regional mapping of step 30 in FIG. 3 according to one exemplary embodiment of the disclosed concept. The method begins at step 45, wherein the subject MR kidney volume is preprocessed by application of total variation (TV) regularization to the subject MR kidney volume to create a TV regularized subject MR kidney volume. The TV regularization reduces image noise and improves image signal homogeneity. The TV regularization process also increases the regional conductivity of voxels representing the kidney. In the exemplary embodiment, the parameters of TV regularization are 0.1 and 100 for regularization ($\lambda$) and iteration, respectively. A sample original MR image and sample TV regularized image are shown in FIGS. 5a and 5b, respectively. Next, at step 50, the magnitudes of image gradients for the TV regularized subject MR kidney volume are computed. The computing of magnitudes of image gradients is a process of finding edges (gradients) in an image and figuring out how strong it is (i.e., what the magnitude is). If a region has a high contrast, the magnitude of the gradient (edge) is high. The magnitudes of image gradients, which are similar to contours often used in maps, represent the base image features for the extracted boundary of the candidate kidney regions. In the exemplary embodiment, to obtain the full range of direction, the magnitudes of image gradients were calculated in three different locations. Sample magnitudes of image gradients are shown in FIG. 5c.

Figure 5D:
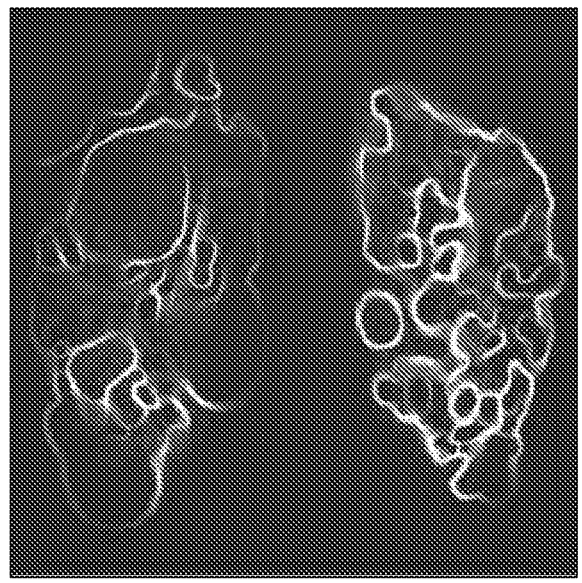
Figure 5E:
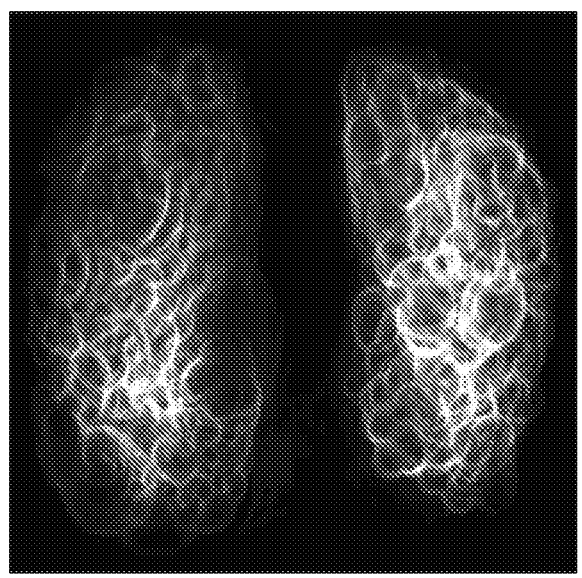
FIGS. 5e and 5f show three-dimensional volume of magnitudes projected onto the two-dimensional coronal plane (i.e., from the anterior to the posterior direction of the abdomen) and the one-dimensional axial plane (i.e., from the superior to the inferior direction), respectively.
Figure 5F:
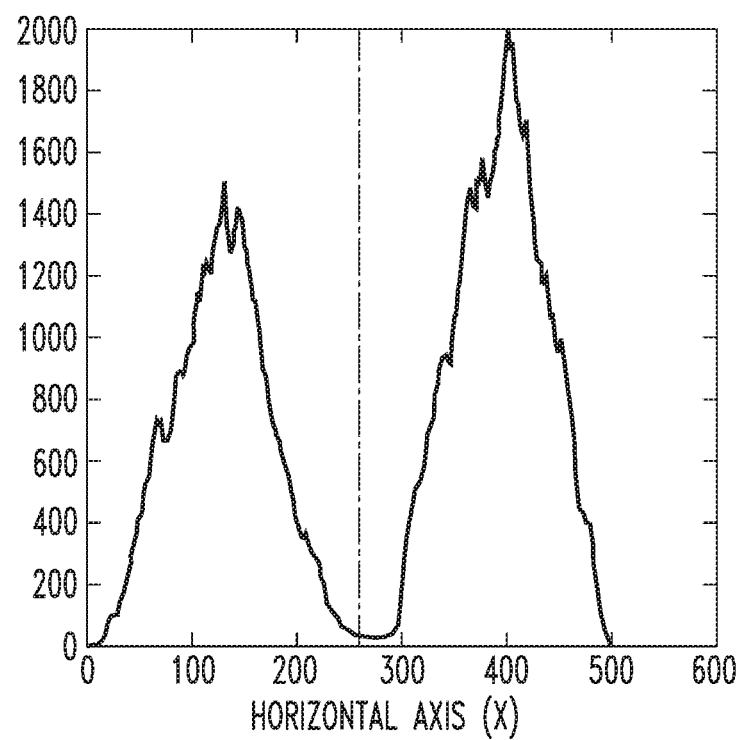
Figure 7A:
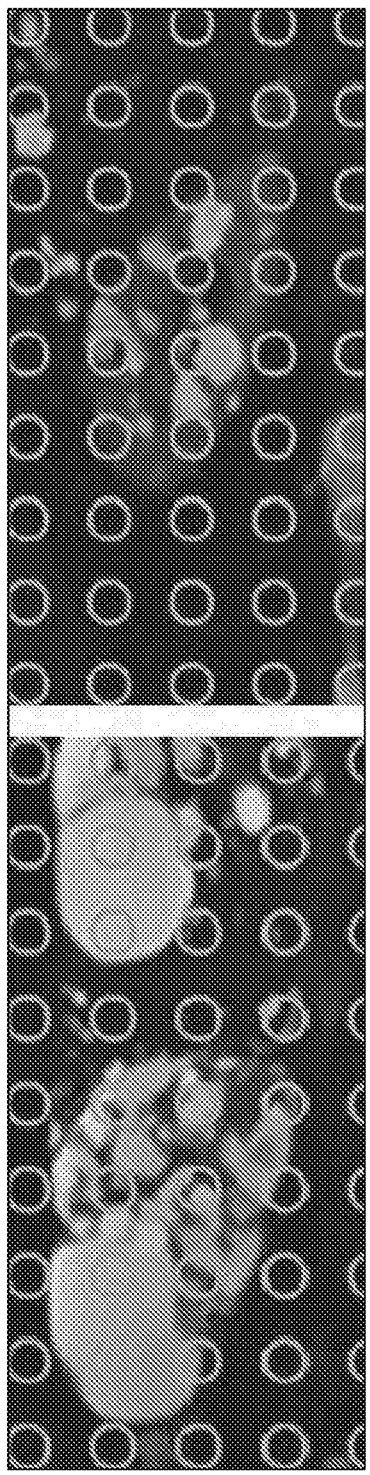
FIGS. 7a-7f show the evolution of contours according to one exemplary embodiment of the disclosed concept.
Figure 7B:
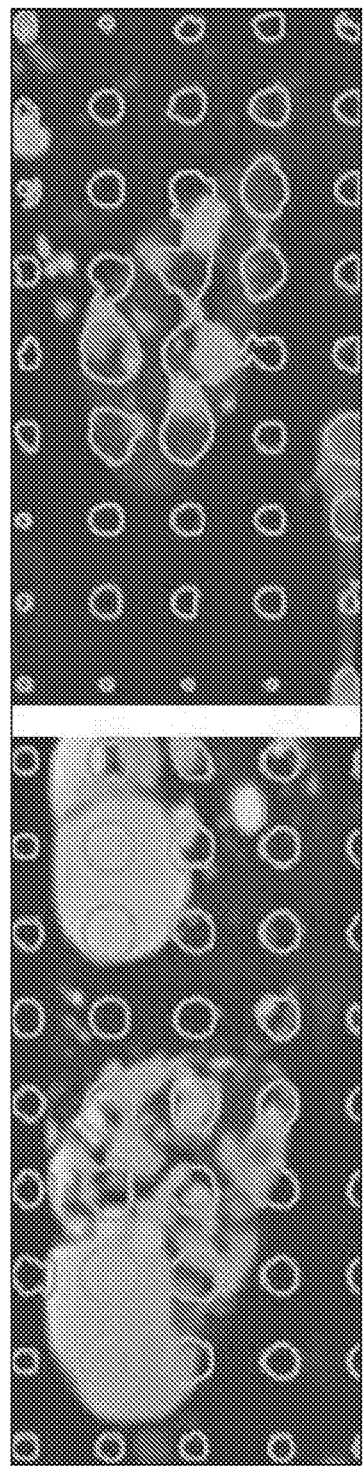
Figure 7C:
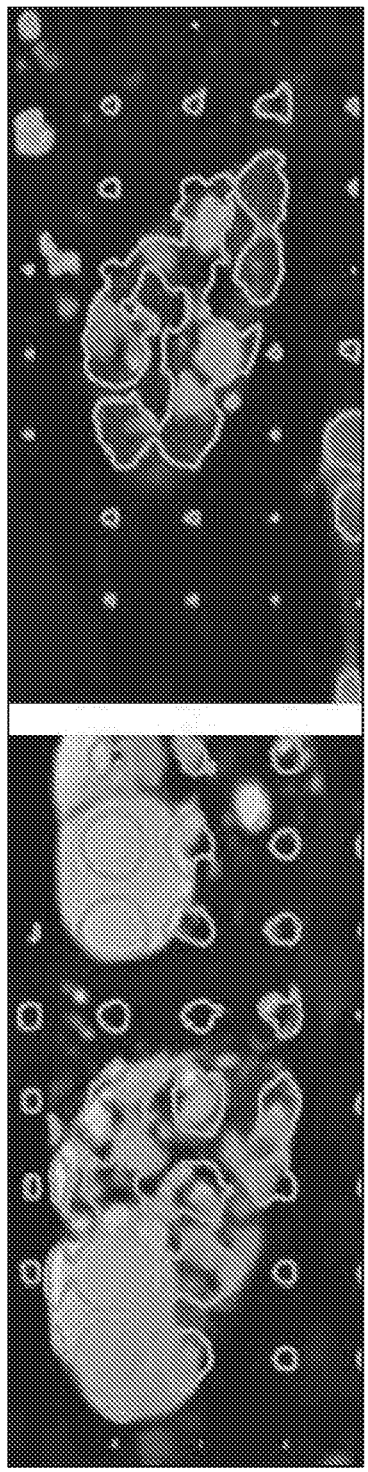
Figure 7D:
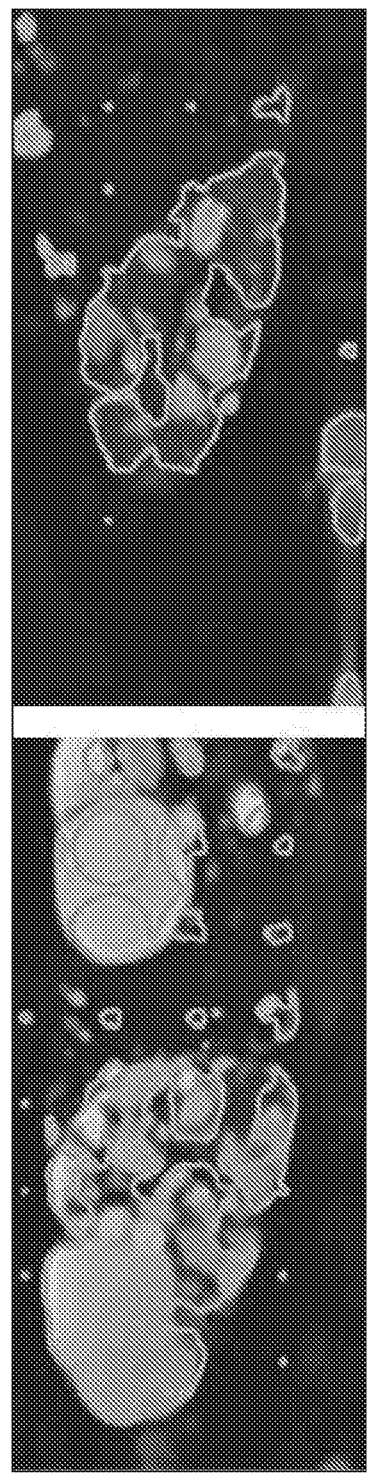
Figure 7E:
Figure 7F:
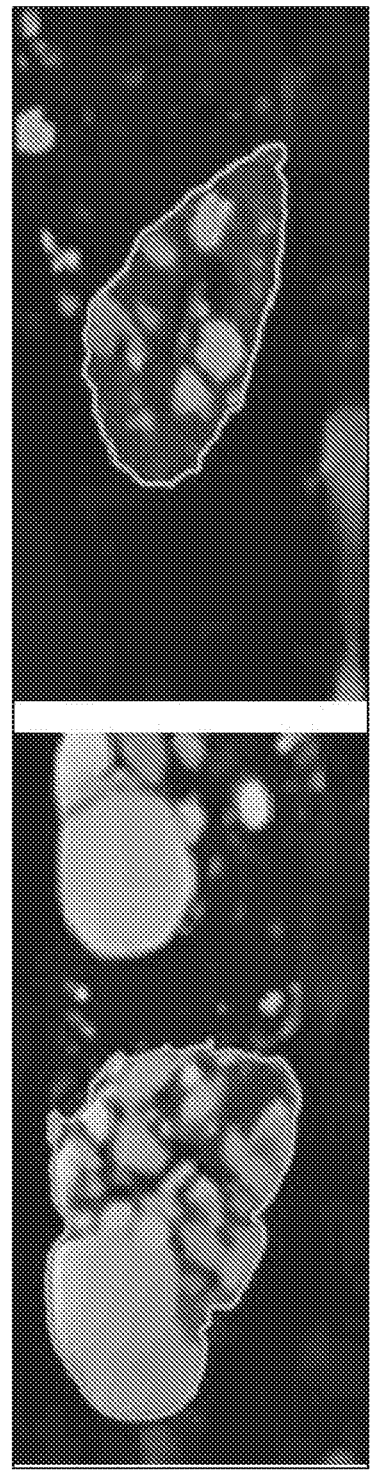

Next, at step 55, a map of candidate kidney regions for the subject MR kidney volume is generated by multiplying the magnitudes of image gradients by the SPPM. In particular, generating the map of kidney candidate regions is a process of assigning probability values to each pixel of the subject MR kidney volume by using the SPPM. This step is performed by multiplying the gradient magnitude and the SPPM pixel by pixel. An example map of candidate kidney regions is shown in FIG. 5d. In particular, in the exemplary embodiment, the three-dimensional volume of magnitudes was projected onto the two-dimensional coronal plane (i.e., from the anterior to the posterior direction of the abdomen) and then on to the one-dimensional axial plane (i.e., from the superior to the inferior direction) as shown in FIGS. 5e and 5f, respectively.

Next, in step 60, the map of candidate kidney regions is separated into right and left kidney regions. In particular, in the exemplary embodiment, with the one-dimensional signal obtained by the affirmation two projections, the separation between the left and right kidney regions was determined by using Otsu's method from the bimodal distribution of the signals. Thus, following step 60, each separated kidney region will contain data for a single kidney. This step makes the kidney segmentation easier by treating the two kidneys independently.

FIG. 6 is a flowchart showing a method of performing the boundary refinement of step 35 in FIG. 3 according to one exemplary embodiment of the disclosed concept. The method begins at step 65, wherein rough kidney boundaries (also referred to as contours) are iteratively determined for each of the left and right kidney regions using the map of candidate kidney regions and a level set framework that employs the SPPM and a propagated shape constraint (PSC) to create an evolved contour for each of the left and right kidney regions. In particular, in the level set framework, this is achieved by slowly moving contours until they reach the boundary of kidneys by satisfying the constraints of the SPPM and the PSC that are incorporated into the level set framework. In the exemplary embodiment, the level set framework is a scheme for optimizing (minimizing) the defined energy terms, wherein the energy terms are defined to be minimized once the initial contour (i.e., random circles in MR volumes) reaches the boundary of the kidneys. An exemplary embodiment of this process is demonstrated in FIGS. 7a-7f, which show the evolution of contours with iterations at (a) 0, (b) 5, (c) 10, (d) 20, (e) 30, and (f) 50 (the contours are drawn as solid lines overlaid on the noise reduced original MR images). Also in the exemplary embodiment, the PSC is used to maintain the segmentation result as similar to the segmentation result of a neighboring slice as possible. This is based on the fact that adjacent slices are similar, so the segmentation result of the neighboring slice is utilized for the constraint. Thus, in the exemplary embodiment, the constraints are expressed in energy terms, and the segmentation is achieved as a particular case of minimizing energies. The total energy represents the sum of the three energy terms corresponding to the subject MR kidney volume, the SPPM, and the PSC. The SPPM or the PSC energy term is expressed as a function of the probability distribution and the Heaviside function, where the variable of the Heaviside function represents the level set function, defining the evolving contour of segmentation. The motion equation is derived from the aforementioned total energy function by using Euler Lagrange equation as set forth below:

$$E(\phi) = E_{image}(\phi) + E_{SPPM}(\phi) + E_{PSC}(\phi)$$

$$E_{SPPM}(\phi) = -\int_\Omega \ln P_{SPPM}(x) H(\phi) dx - \int_\Omega \ln(1 - P_{SPPM}(x))(1 - H(\phi)) dx$$

$$E_{PSC}(\phi) = -\int_\Omega \ln P_{PSC}(x) H(\phi) dx - \int_\Omega \ln(1 - P_{PSC}(x))(1 - H(\phi)) dx$$

$$P_{PSC}(x) = G(x) * H(\phi')$$

$$\frac{\partial E}{\partial \phi} = -\frac{\partial \phi}{\partial t}$$

$$\frac{\partial \phi}{\partial t} = \delta(\phi) \left[ div\left(\frac{\nabla \phi}{|\nabla \phi|}\right) - (f(x) - \bar{f}_{in})^2 + (f(x) - \bar{f}_{out})^2 + \ln\left(\frac{P_{SPPM}}{1 - P_{SPPM}}\right) + \ln\left(\frac{P_{PSC}}{1 - P_{PSC}}\right) \right]$$

Finally, referring again to FIG. 6, at step 70, morphological closing is performed on the evolved contour of step 65 for each of the left and right kidney regions to generate the automatically segmented subject MR kidney volume. As is known in the art, morphological closing is an image processing technique used for smoothing the boundaries of objects of given binary or grade level images. The operation begins with dilation followed by erosion. As the name implies, the dilation operation expands the objects, while the erosion operation shrinks the objects by "peeling" their boundaries. By repeating the steps, the boundary of each object becomes smoother than before.

Figure 8A:
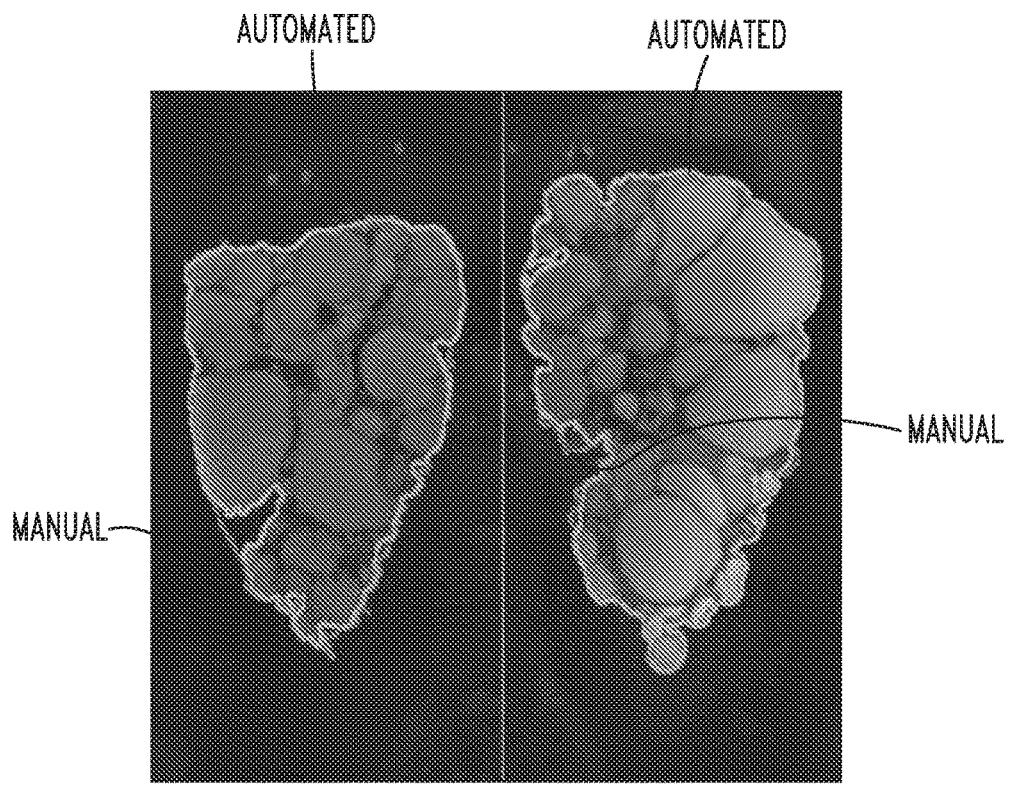
FIGS. 8a-8d show examples of MR images of ADPKD kidneys segmented with a prior art manual method and the automated method of the disclosed concept.
Figure 8B:
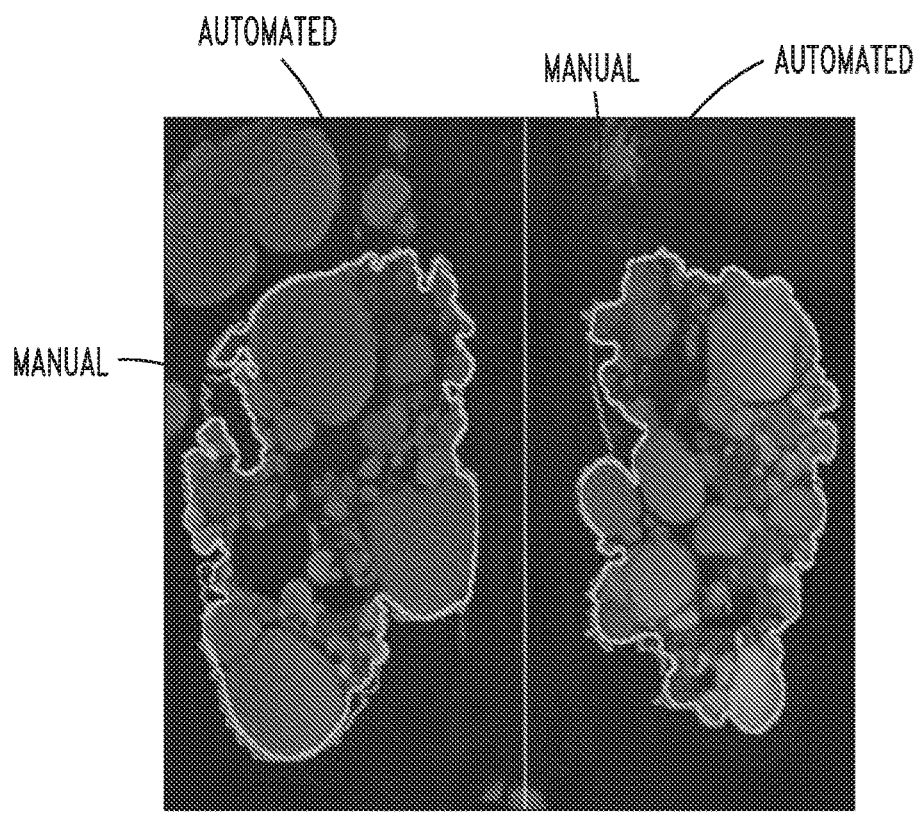
Figure 8C:
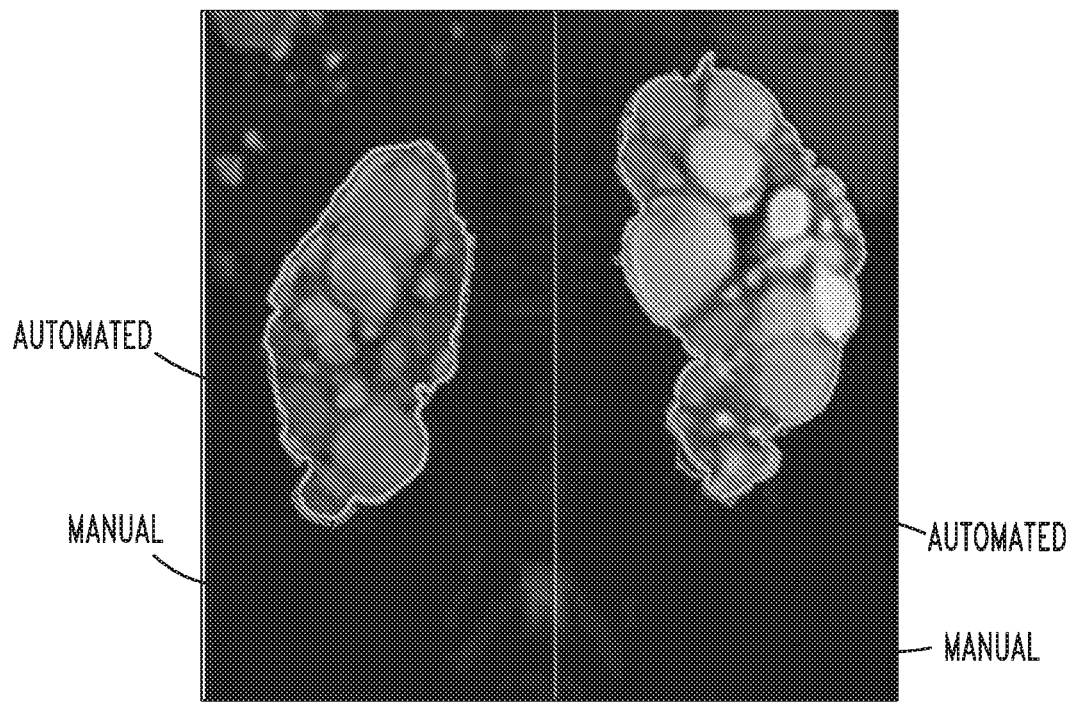
Figure 8D:
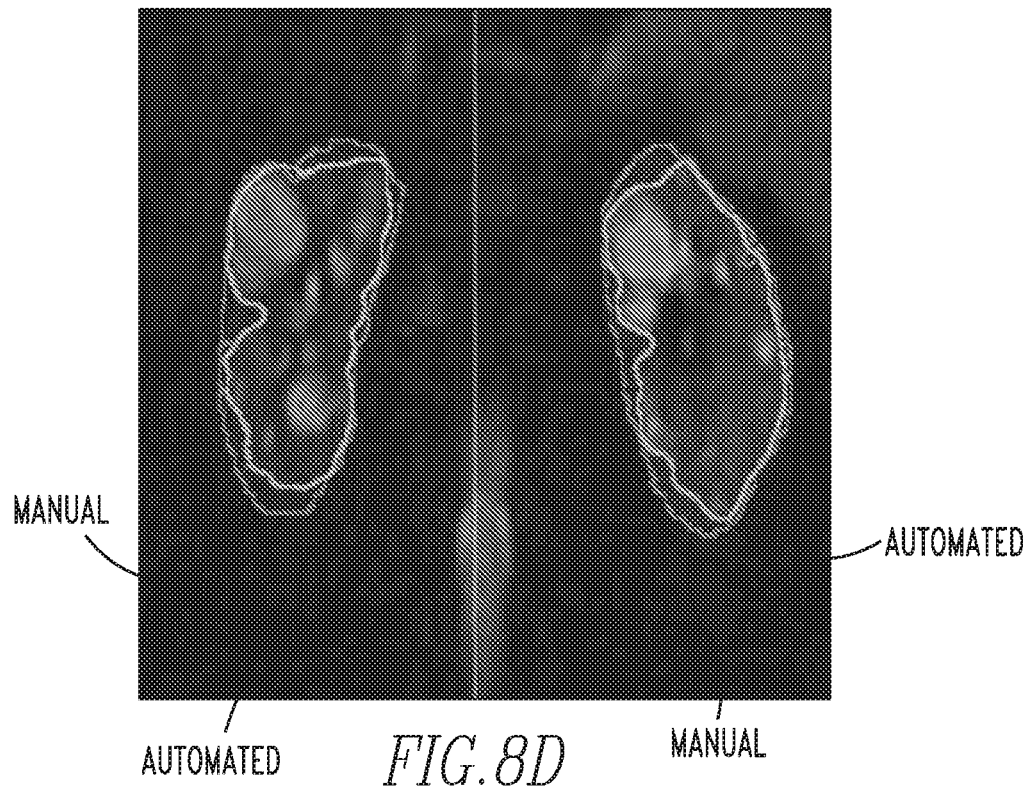

FIGS. 8a-8d show examples of MR images of ADPKD kidneys segmented with a prior art manual method and the automated method of the disclosed concept (the solid lines separate the right and left kidney). As shown in FIGS. 8b, 8c and 8d, the method of the disclosed concept is able to successfully segmented the kidney boundaries closely in contact with liver cysts (8b and 8c) and the spleen (8d).

As described above, step 40 of FIG. 3 involves calculating subject TKV using the automatically segmented subject MR kidney volume that is generated. In the exemplary embodiment, the following steps are performed to calculate TKV once the subject MR kidney volume is segmented according to the disclosed concept. First, the number of pixels segmented (classified) as representing the kidneys are counted. Next, by using pixel spacing and slice thickness information from the DICOM header, the number of pixels are multiplied by these two pieces of information. Pixel spacing and slice thickness are the physical size of each pixel in an image, usually represented in millimeters. The DICOM header is the information associated with an MR volume containing a set of parameters such as patient information (e.g., age, sex, etc.) and MR parameters used to generate the volume.

Figure 9:
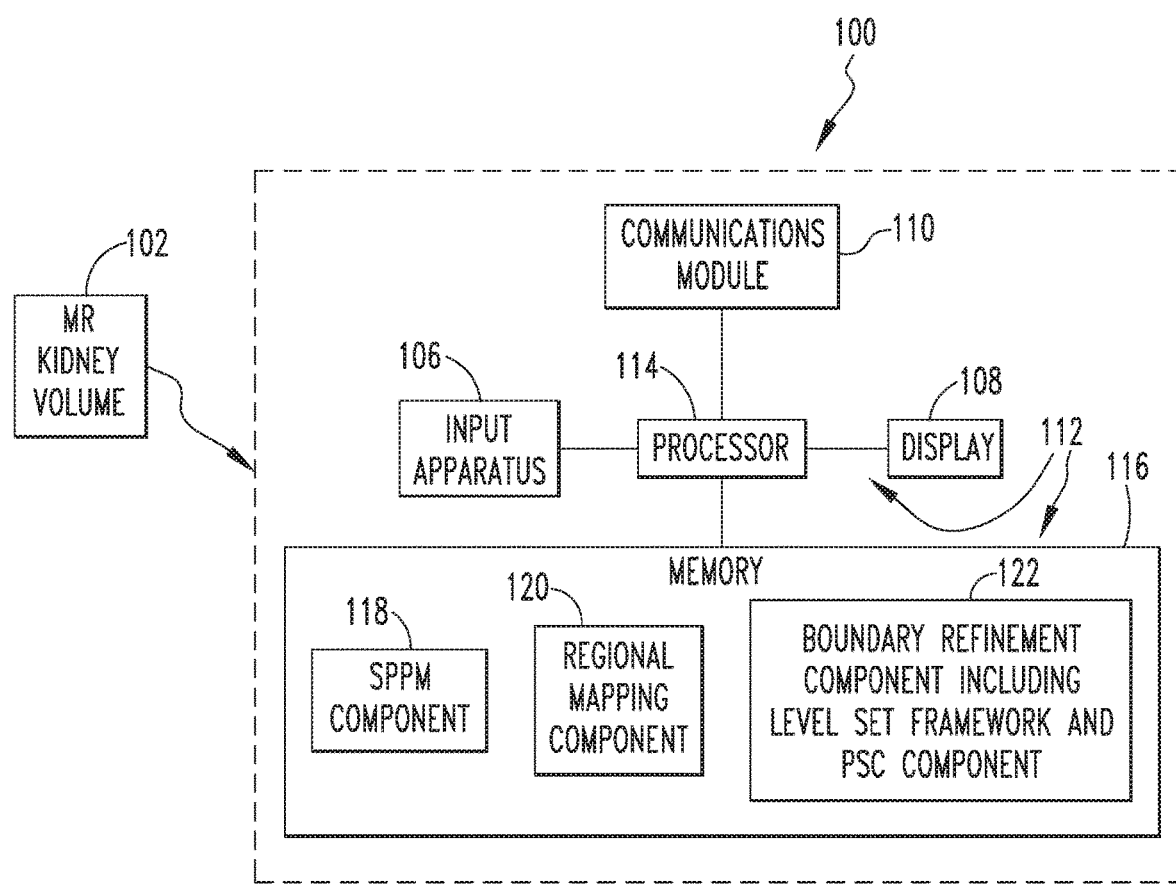
FIG. 9 is a schematic block diagram of an automated organ segmentation system according to an exemplary embodiment of the disclosed concept that may be used to automatically segment and/or calculate TKV of a subject MR kidney volume.

FIG. 9 is a schematic block diagram of an automated organ segmentation system 100 according to an exemplary embodiment of the disclosed concept that may be used to automatically segment and/or calculate TKV of a subject MR kidney volume 102. As seen in FIG. 9, automated organ segmentation system 100 includes a computing device 104 that is structured to receive the data of MR kidney volume 102 by any suitable method, such as, for example, a wired or wireless connection. Computing device 104 may be, for example and without limitation, a PC, a laptop computer, a tablet computer, a smartphone, or any other suitable device structured to perform the functionality described herein. Computing device 104 is structured and configured to receive the MR kidney volume 102 data and process the data using an embodiment of the methodology described in detail herein to segment and/or calculate the TKV of MR kidney volume 102.

As seen in FIG. 9, in the exemplary embodiment, computing device 104 includes an input apparatus 106 (which in the illustrated embodiment is a keyboard), a display 108 (which in the illustrated embodiment is an LCD), a communications module 110, and a processor apparatus 112. A user is able to provide input into processor apparatus 112 using input apparatus 106, and processor apparatus 112 provides output signals to display 108 to enable display 108 to display information to the user, such as a visual representation of the segmented MR kidney volume 102 and/or information regarding the TKD of MR kidney volume 102. In addition, that same information may be transmitted to a remote location (e.g., for use by remote clinician) using communications module 110, which may be a wired or wireless communications module. Processor apparatus 112 comprises a processor 114 and a memory 116. Processor 114 may be, for example and without limitation, a microprocessor (μP), a microcontroller, or some other suitable processing device, that interfaces with memory 116. Memory 16 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. Memory 116 has stored therein a number of routines that are executable by processor 114. One or more of the routines implement (by way of computer/processor executable instructions) at least one embodiment of the method discussed herein that is configured to automatically segment and/or calculate the volume of an MR kidney volume. In particular, as seen in FIG. 9, memory 116 includes an SPPM component 118 which stores the SPPM created according to the method of FIG. 1, a regional mapping component 120 that is configured to perform the regional mapping method of FIG. 3, and a boundary refinement component 122 that includes a level set framework and PSC component that is configured to perform the boundary refinement method of FIG. 6.

Thus, the disclosed concept provides a fully automated system and method for segmenting and/or determining a volumetric measurement of kidneys from MR images in subjects, such as subjects with ADPKD. Furthermore, the disclosed concept is not limited to application to only MR kidney images, but rather may be employed for automated segmenting and volume measurement of MR images of other organs such as, for example, and without limitation, the lungs and/or liver.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of segmenting an MR organ volume, comprising:
    performing regional mapping on the MR organ volume using a spatial prior probability map of a location of the organ to create a regionally mapped MR organ volume, wherein the regional mapping comprises:
        preprocessing the MR organ volume by application of total variation regularization to the MR organ volume to create a TV regularized MR organ volume;
        computing magnitudes of image gradients for the TV regularized MR organ volume; and
        generating a map of candidate organ regions for the MR organ volume by multiplying the magnitudes of image gradients by the spatial prior probability map; and
    performing boundary refinement on the regionally mapped MR organ volume using a level set framework that employs the spatial prior probability map and a propagated shape constraint to generate a segmented MR organ volume.

2. The method according to claim 1, wherein the MR organ volume is an MR kidney volume, wherein the regionally mapped MR organ volume is a regionally mapped MR kidney volume, and wherein the segmented MR organ volume is a segmented MR kidney volume.

3. The method according to claim 2, wherein the spatial prior probability map is a spatial prior probability map of the location of kidneys in a number of abdominal MR images.

4. The method according to claim 1, wherein the MR organ volume is an MR kidney volume and wherein the method further includes separating the map of candidate organ regions into a right kidney region and a left kidney region.

5. The method according to claim 1, wherein the boundary refinement comprises:
iteratively determining an evolved contour for the MR organ volume using the map of candidate organ regions and the level set framework; and
performing morphological closing on the evolved contour to generate the segmented MR organ volume.

6. The method according to claim 1, wherein the propagated shape constraint enforces organ contours in neighboring MR images of the MR organ volume.

7. The method according to claim 1, further comprising generating and displaying a segmented output image using the segmented MR organ volume.

8. A non-transitory computer readable medium storing one or more programs, including instructions, which when executed by a computer, causes the computer to perform the method of claim 1.

9. A computerized system for segmenting an MR organ volume, comprising:
a processing apparatus, wherein the processing apparatus includes:
a spatial prior probability map component that includes a spatial prior probability map of a location of the organ;
a regional mapping component configured for creating a regionally mapped MR organ volume by performing regional mapping on the MR organ volume using the spatial prior probability map, wherein the regional mapping component is structured and configured to, preprocess the MR organ volume by application of total variation regularization to the MR organ volume to create a TV regularized MR organ volume; compute magnitudes of image gradients for the TV regularized MR organ volume; and generate a map of candidate organ regions for the MR organ volume by multiplying the magnitudes of image gradients by the spatial prior probability map; and
a boundary refinement component configured for generating a segmented MR organ volume by performing boundary refinement on the regionally mapped MR organ volume using a level set framework that employs the spatial prior probability map and a propagated shape constraint, wherein the map of candidate organ regions is used by the boundary refinement component.

10. The system according to claim 8, further comprising a display structured to receive the segmented MR organ volume and generate and display an output image based on the segmented MR organ volume.

11. The system according to claim 9, wherein the MR organ volume is an MR kidney volume, wherein the regionally mapped MR organ volume is a regionally mapped MR kidney volume, and wherein the segmented MR organ volume is a segmented MR kidney volume.

12. The system according to claim 11, wherein the spatial prior probability map is a spatial prior probability map of the location of kidneys in a number of abdominal MR images.

13. The system according to claim 9, wherein the MR organ volume is an MR kidney volume and wherein the regional mapping component is structured and configured to separate the map of candidate organ regions into a right kidney region and a left kidney region.

14. The system according to claim 9, wherein the boundary refinement component is structured and configured to:
iteratively determine an evolved contour for the MR organ volume using the map of candidate organ regions and the level set framework; and
perform morphological closing on the evolved contour to generate the segmented MR organ volume.

15. The system according to claim 9, wherein the propagated shape constraint enforces organ contours in neighboring MR images of the MR organ volume.

* * * * *